United States Patent
Wilhelmsson et al.

(10) Patent No.: US 7,949,302 B2
(45) Date of Patent: May 24, 2011

(54) METHOD AND SYSTEM FOR DYNAMIC CARRIER SELECTION

(75) Inventors: Leif Wilhelmsson, Dalby (SE); Joakim Persson, Barsebäck (SE); Jacobus Haartsen, Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 12/357,983

(22) Filed: Jan. 22, 2009

(65) Prior Publication Data

US 2009/0176453 A1    Jul. 9, 2009

Related U.S. Application Data

(62) Division of application No. 09/894,050, filed on Jun. 28, 2001.

(60) Provisional application No. 60/244,776, filed on Oct. 31, 2000.

(51) Int. Cl.
*H04B 7/00* (2006.01)
(52) U.S. Cl. ...................... 455/41.2; 455/434
(58) Field of Classification Search .................. 455/63, 455/434, 67.13, 41.2; 375/132
See application file for complete search history.

(56) References Cited

U.S. PATENT DOCUMENTS

| | | | | |
|---|---|---|---|---|
| 5,926,501 A | * | 7/1999 | Souissi et al. | 375/131 |
| 6,519,460 B1 | * | 2/2003 | Haartsen | 455/452.1 |
| 6,996,100 B1 | * | 2/2006 | Haartsen | 370/389 |
| 7,483,984 B1 | * | 1/2009 | Jonker et al. | 709/226 |
| 2002/0044549 A1 | * | 4/2002 | Johansson et al. | 370/386 |
| 2004/0005020 A1 | * | 1/2004 | Dent | 375/343 |

FOREIGN PATENT DOCUMENTS

| | | | |
|---|---|---|---|
| WO | WO 93/26100 | * | 12/1993 |
| WO | WO 98/48586 | * | 10/1998 |

* cited by examiner

*Primary Examiner* — William J Deane

(57) ABSTRACT

A dynamic carrier selection method and system permit units operating on a first carrier to change to a second carrier when performance of the first carrier becomes unacceptable. Carrier quality measurements are taken in which carrier quality is a function of interference and multi-path fading and carrier-signal strength. The carriers are ranked according to measured quality in a carrier candidate list. The carrier candidate list is used to permit units to determine which carrier they should switch to when the carrier there currently operating on is determined to have unacceptable performance. Carrier measurements are retaken in response to a carrier change by unit or a predetermined time period having elapsed.

74 Claims, 3 Drawing Sheets

METHOD AND SYSTEM FOR DYNAMIC CARRIER SELECTION

CROSS-REFERENCE TO RELATED APPLICATIONS

This application is a divisional of U.S. patent application Ser. No. 09/894,050 filed on Jun. 28, 2001 (currently pending).

This application claims priority from U.S. Provisional Patent Application No. 60/244,776, filed on Oct. 31, 2000 and bearing (currently expired). This patent application incorporates U.S. Provisional Patent Application No. 60/244,776 and U.S. patent application Ser. No. 09/894,050 by reference.

TECHNICAL FIELD

This invention relates generally to communications in which total available bandwidth is larger than that needed for communication and, more particularly, to optimization of communication systems in which communicating devices are allowed to change carriers in order to make use of excess available bandwidth.

BACKGROUND OF THE INVENTION

In wireless communication systems, data to be communicated is typically transmitted in bursts on a carrier whose characteristics vary over time. In other words, a first burst of data might be transmitted over the carrier while the carrier has very good performance that allows the first burst of data to be received correctly, while, as a second burst of data is transmitted on the carrier, the performance of the carrier might have worsened such that the second burst of data is not received correctly. This problem can be explained by the fact that carriers include multiple paths; therefore, even a small movement by either a transmitter or a receiver can affect whether these multiple paths add constructively or destructively.

If a rate of change of the performance of a carrier is relatively great in comparison to a data rate on the carrier, the problem of varying carrier performance can be solved using coding and interleaving, in which carrier performance variations are averaged so that the carrier's performance depends on average carrier conditions rather than on worst-case carrier conditions. However, if the carrier's performance varies relatively slowly and/or if the data rate is relatively great, this approach is not feasible because the number of symbols needed in an interleaver is too large. In such situations, an entire packet could be received during a period in which the carrier's performance is poor.

Multi-path carriers are frequency-selective; therefore, if performance of a first carrier having a first frequency is poor, performance of a second carrier having a second frequency is often better, especially if the second frequency is not too close to the first frequency. The coherence bandwidth is a measure of how far apart the two frequencies must be in order for the two carriers to be uncorrelated.

Reference is now made to FIG. 1, wherein there is shown a graph representing an exemplary indoor bandwidth operating at 2.45 GHz as a function of frequency. Graph 100 shows frequency in MegaHertz (MHz) on an x-axis and on a y-axis, signal strength is plotted in decibels (dB) (i.e., 20 log [abs(H (f))]. A bandwidth 102 is shifted on the x-axis so that 0 Hz corresponds to the carrier being used. The bandwidth 102 has good performance near 0 Hz and 10-15 MHz, whereas it is about 10 dB worse near 23 MHz, and has its worst performance near 6 MHz. The bandwidth of FIG. 1 has a coherence bandwidth of about 10 MHz.

One way of communicating over a frequency-selective carrier is by means of frequency hopping (FH), which is used, for example, in the BLUETOOTH wireless technology system. See, e.g., J. C. Haartsen, "The Bluetooth radio system," IEEE Personal Communications, Vol. 7, No. 1, February 2000. In the BLUETOOTH wireless technology system, which is an ad-hoc system that operates in the unlicenced Industrial Scientific and Medical (ISM) band at 2.45 GHz, one of the reasons for employing FH over 79 1-MHz-wide carriers is to avoid transmitting on a single carrier that could be strongly attenuated for a long time period due to multi-path fading. Another reason for using FH is to have a system that is robust to interference from other users as well as from other impairments.

Frequency hopping is a way of averaging quality of the total available bandwidth, and, in situations in which the carrier performance changes rapidly, FH often provides best-case real-world performance. However, in situations in which a portion of the bandwidth changes slowly, it would be desirable to further improve performance. For example, if a part of the bandwidth is disturbed by an almost static interferer, this part of the bandwidth should typically be avoided. A static interferer could, for example, be a turned-on microwave oven, since many microwave ovens use part of the ISM band.

Carriers that are operating in a part of the bandwidth that is disturbed by almost-static interferer(s) should be avoided. A procedure for selecting suitable carriers that are not affected by the almost-static interferer(s) would be desirable. There is accordingly a need for a method and system for carrier selection in response to worsening carrier performance when the carriers performance varies relatively slowly and/or the data rate is relatively great.

SUMMARY OF THE INVENTION

These and other problems are solved by the present invention, wherein a dynamic carrier-selection method includes the steps of creating a candidate carrier list from a plurality of carriers and changing from a first carrier of the plurality of carriers to a second carrier of the plurality of carriers in response to a determination that the quality of the first carrier is not acceptable. The second carrier is included in the carrier list. Quality of each of the plurality of carriers can be measured and the plurality of carriers can be ranked according to the measured quality. The candidate carrier list can be created in accordance with the ranking of the plurality of carriers. The second carrier is preferably the carrier, other than the first carrier, that has the greatest measured quality.

In another embodiment of the invention, a dynamic carrier-selection system includes a candidate carrier list that includes a list of a plurality of carriers and a unit operating on a first carrier of the plurality of carriers. The unit changes from the first carrier of the plurality of carriers to a second carrier of the plurality of carriers with reference to the candidate carrier list in response to a determination that the quality of the first carrier is not acceptable. The candidate carrier list can include a ranking according to quality of the plurality of carriers. The candidate carrier list can include an arbitrary selection of at least one carrier of the plurality of carriers.

In yet another embodiment of the invention, a dynamic carrier-selection method includes the steps of creating a candidate carrier list of a plurality of carriers and changing by a first unit operating on a first carrier of the plurality of carriers to a second carrier of the plurality of carriers in response to a determination that the quality of the first carrier is not acceptable. The second carrier is the carrier other than the first carrier that has the greatest measured quality. The quality of each of the plurality of carriers is measured and the plurality of carriers according to the measured quality. The candidate carrier list is updated in accordance with the re-ranking of the plurality of carriers.

In yet another embodiment of the invention, a method of updating a list of acceptable carriers includes the steps of determining whether a predetermined time period has elapsed since a plurality of carriers was last ranked according to measured quality and determining whether a carrier change has occurred since the plurality of carriers was ranked according to measured quality. In response to a determination that either the predetermined time period has elapsed or that a carrier change has occurred since the plurality of carriers was ranked according to measured quality, quality of the plurality of carriers is measured. The carriers are ranked according to the most recent quality measurement.

BRIEF DESCRIPTION OF THE DRAWINGS

A more complete understanding of the method and system of the present invention maybe acquired by reference to the following Description of the Preferred Embodiments when taken in conjunction with the accompanying Drawings wherein.

DETAILED DESCRIPTION OF THE PREFERRED EMBODIMENTS

Figure 1:
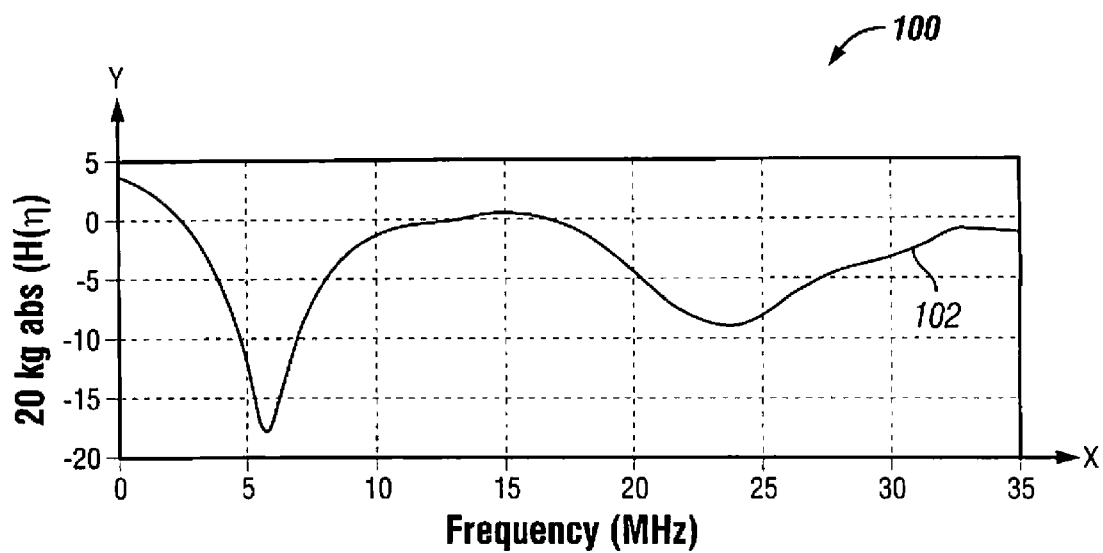
FIG. 1 is a graph that illustrates an exemplary indoor bandwidth operating at 2.45 GHz as a function of frequency.

If carrier performance changes slowly, it would be desirable to measure quality of an entire available bandwidth. Measurement of the entire available bandwidth reveals if there are any parts of the bandwidth that should be avoided because of the presence of static interference and also shows which parts of the bandwidth are performing well and which are performing poorly due to frequency-selective fading. A system that can exploit the latter has been described in the application "Resource management in uncoordinated frequency hopping system," U.S. patent application Ser. No. 09/385,024, which was filed Aug. 30, 1999 and is incorporated herein by reference. In application Ser. No. 09/385,024, a high-speed (HS) mode that can be incorporated in, for example, the BLUETOOTH wireless technology system is described.

A HS carrier operating according to the HS mode is based on a dynamic carrier selection (DCS) algorithm rather than on frequency hopping (FH). With DCS, carriers in the available bandwidth that are attractive both from a propagation (i.e., fading) and from an interference (i.e., low disturbance) point of view are selected.

The DCS algorithm involves collection of information via measurement of a frequency spectrum. Of course, measuring the entire available bandwidth in such a way that non-static interference (e.g., hopping BLUETOOTH wireless technology units) is averaged out can take some time; therefore, such measurements should not be taken unless necessary. It is advantageous for the measurements to be taken at the same time that data is transmitted, so that neither the carrier nor time is wasted by measurements being taken alone. In particular, since at least two units must be involved in a communication, one way of reducing the time needed for taking measurements is to have several units take carrier measurements and then combine the measured values. In this way, the same number of measurements can be taken in a shorter period of time than if only one unit were taking measurements.

A systematic approach to dynamically determining the best part of the available bandwidth without taking new carrier measurements every time a carriers performance becomes poor is achieved by the present invention. A list of candidate carriers can be maintained to enable the DCS algorithm to quickly find a better-performing carrier. Since the carriers performance is changing, the candidate list must be updated periodically in order to adequately reflect which part of the available bandwidth should be used. A critical issue regarding when to change from a carrier that has become bad to a potentially better one involves synchronization; that is, all the units involved in the communications must change at the same time and to the same new carrier. Communications regarding this change may be hampered if, as is often the case, the current carrier is impaired. A carrier reselection mechanism that can be efficiently used and that makes use of the fact that one or several devices involved in the communication might still be using a frequency-hopping (FH) carrier is achieved by the present invention. The present invention enables measurement of the entire available frequency band and provides a mechanism for frequency changes to a better carrier to occur.

To facilitate description of the present invention, examples herein are based on a system operating according to the BLUETOOTH wireless technology system (See, e.g. J. C. Haartsen, "The Bluetooth radio system," IEEE Personal Communications, Vol. 7, No. 1, February 2000) and according to the high-speed mode as described in application Ser. No. 09/385,024. The BLUETOOTH wireless technology system applies a 1-MHz-wide FH carrier that uses a pseudo-random FH sequence spanning the entire Industrial, Scientific, and Medical (ISM) band, whereas the high-speed carrier uses a semi-fixed, approximately-4-MHz-wide, carrier that employs dynamic carrier selection (DCS). It is assumed that the BLUETOOTH wireless technology is the fall-back mode of the system.

Figure 2:
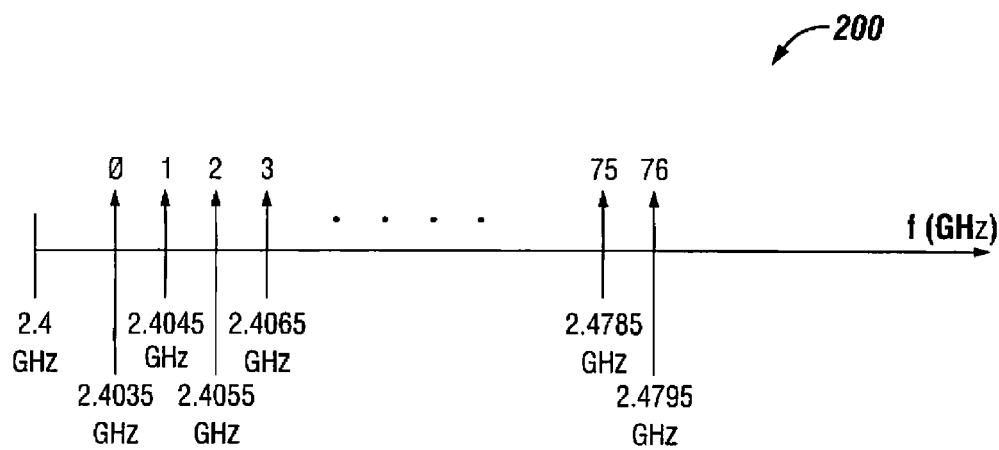
FIG. 2 is a diagram that illustrates a plurality of exemplary carriers of a system operating in accordance with the present invention.

Referring again to the FIGURES, FIG. 2 is a diagram that illustrates a plurality of exemplary carriers of a system operating in accordance with the present invention. Carriers 0-76 are illustrated in a range from 2.4-2.4795 GHz, the carriers 0, 1, 2, 3, 75, and 76 being explicitly shown. The number of carriers depends on the available bandwidth and other system parameters. In FIG. 2, a given carrier is separated by 1 MHz from adjacent carriers (e.g., the carrier 1 operates at 2.4045 GHz, while the carriers 0 and 2 operate at 2.4035 GHz and 2.4055 GHz, respectively). As should be obvious to those skilled in the art, the present invention is not restricted to a system based on the BLUETOOTH wireless technology system, but, with appropriate modifications, can be used with other systems as well.

In an embodiment of the present invention, the HS mode can be viewed as an extension mode of the BLUETOOTH wireless technology system that can, for example, be entered into for a limited time when a higher data rate is desired. One such scenario could be when a large file is sent from a laptop computer to a printer. Another scenario could be communication of streaming video. Even if two or more units have negotiated to use the HS mode, they might still enter the frequency-hopping mode to take part in traffic on the FH carrier. Also, if a unit is only involved in HS traffic during a certain period of time, it should still make sure that it stays synchronized to the FH carrier. This can be achieved by the unit listening to beacons that are part of the FH system. A more detailed description of this mode can be found in application Ser. No. 09/385,024.

A determination of which carrier to operate on is made in connection with the HS mode. The condition of the carrier, both with respect to interference and with respect to multi-path fading, is obtained via a measurement algorithm. The measurement algorithm can comprise several stages. A first part of the algorithm is performed when the system is operating in the FH mode. In this mode, initial carrier measurements are taken. Interference levels in the total available bandwidth are determined by measuring the strength of received signals that can be used in the event that the desired signal is absent. The interference measurements are taken over a period long enough to average out random (i.e., non-static) interferers. In addition to this interference measurement, the desired signal can be monitored by making use of a relative received signal strength indicator (RSSI) value upon reception of valid packets.

The relative RSSI value directly reveals parts of the spectrum in which flat-fading dips due to multi-path interference are occurring. If packets are not correctly received, the carrier is considered poor even if the RSSI value is good, the reason being that either there is interference, which can be derived from the interference level measurements, or inter-symbol interference (i.e., self-interference) has occurred due to frequency-selective fading. The RSSI measurements together with the interference measurement provide a good indication of where the carriers are good, where they are bad due to interference, and where they are bad due to flat or frequency-selective fading.

It can thus be seen from FIG. 2 that a plurality of carriers of a system are distributed across the available bandwidth, the number of carriers depending on the available bandwidth and other system parameters. A determination of which of the plurality of carriers to operate on is made based on the condition of the carriers, both with respect to interference and with respect to multi-path fading, values for which are obtained via a measurement algorithm.

Figure 3:
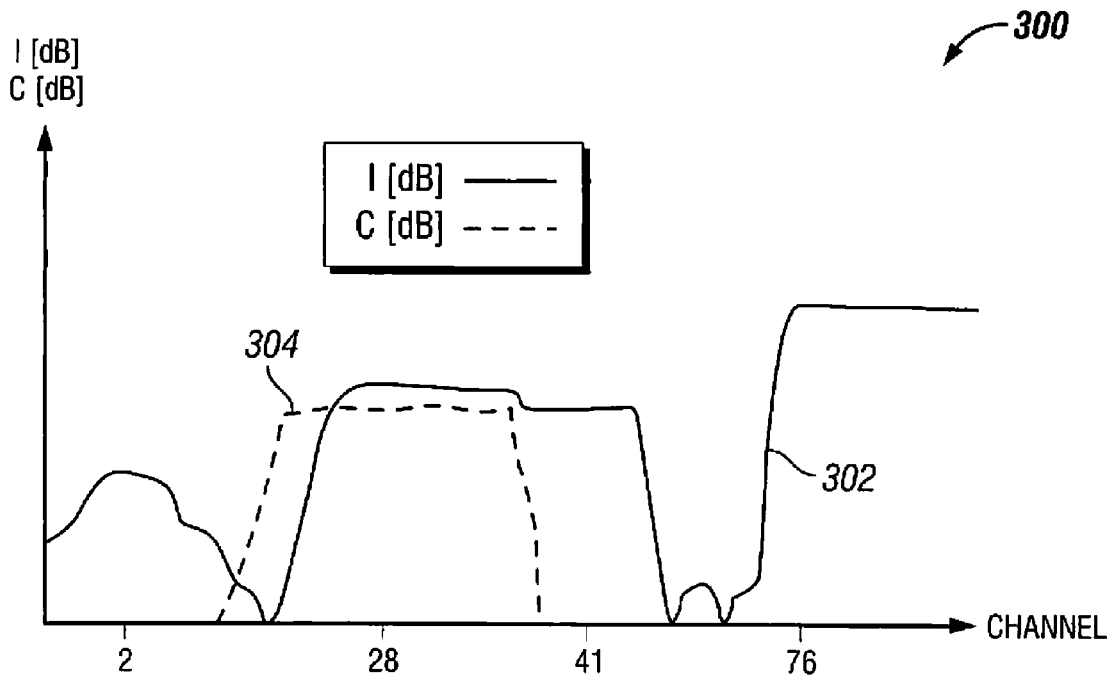
FIG. 3 is a graph of carrier-signal strength and interference-signal strength for the exemplary carriers of FIG. 2.

Reference is now made to FIG. 3, wherein there is shown a graph of carrier-signal strength and interference-signal strength for the exemplary carriers of FIG. 2. A graph 300 illustrates carrier strength (C) in decibels (dB) as a solid line 302 and interference strength (I) in dB as x's 304 for the carriers 0-76, the carriers 2, 28, 41, and 76 being explicitly shown. When measurements are finalized, quality of different parts of the available frequency bandwidth is determined by combining information obtained from the measurements of a desired signal and of interference. The result of this quality determination is preferably a candidate carrier list in which the candidate carriers that can be used by units in the HS mode are ordered, for example, starting with the most preferable carrier to use and ending with the least preferable carrier to use. An exemplary carrier list based on FIG. 3, ordered from greatest to least quality, would be carrier 76, then carrier 41, followed by carrier 2. Carrier 28 would not be a good candidate because of its high interference, and would therefore not be included on the candidate list.

The best carrier is the carrier with the highest carrier-signal-to-interference-signal ratio (C/I), wherein I includes both external and self interference. Therefore, a first carrier in a fading dip might be preferred over a second carrier not in a fading dip if the second carrier contains more interference than the first carrier. In other words, the C/I of the second carrier is lower than in the first carrier, although the C in the second carrier is higher than the first carrier. Carrier measurements can also be taken while in the HS mode. In this case, carrier measurements are taken only on the HS carrier in order to determine if the interference and fading scenarios are changing.

In another embodiment of the invention, the candidate list is created based on measurements taken by a master unit only. In yet another embodiment, the candidate list is created by the master unit, but is based on measurements taken by two or more slave units. The candidate list is then communicated from the master unit to the slave unit(s) that will change to the HS mode.

In yet another embodiment, wherein at least one of the units in the HS mode also takes part in the FH link by means of time division between the HS mode and the FH mode, carrier measurements can be taken by the units while they are in the FH mode, and the list used in the HS mode can then be appropriately updated. Once the carrier measurements are taken and processed by the master unit, the candidate list is created (or updated, if it already exists) and transferred to the slave units. In addition to the candidate frequencies, the list also reveals which of these frequencies are in use by units operating in the HS mode. A new HS carrier is always established in cooperation with the master unit. If a new HS carrier is created, it is indicated as being in use in the candidate list and this information is distributed to the slave units.

In yet another embodiment, a candidate list of carriers is generated by selecting at least one of the carriers in an arbitrary fashion without having first performed any quality measurements of the bandwidth. In yet another embodiment, the quality of the bandwidth is measured and carriers within the bandwidth that meet pre-determined quality criteria are included in the candidate carrier list. Thereafter, in response to worsening conditions of a current carrier, a second carrier is selected in an arbitrary fashion from the previously-generated candidate carrier list.

It can thus be seen from FIG. 3 that measurements of carrier-signal strength and interference-signal strength are used to determine the quality of different parts of the available frequency bandwidth. Carrier strength and interference strength measurements are combined to create a candidate carrier list in which candidate carriers that can be used by units are ordered. Interference strength includes both external and self interference. The best carrier is the carrier with the highest carrier-signal-to-interference-signal ratio (C/I).

Figure 4:
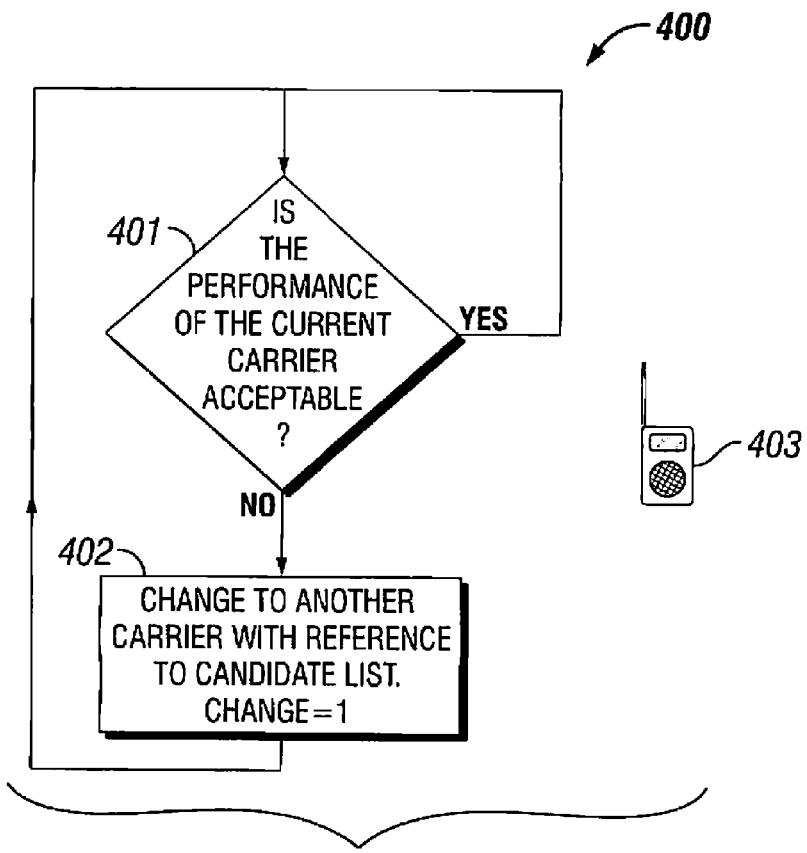
FIG. 4 is a flow diagram illustrating a process of changing from a first carrier to a second carrier in response to worsening carrier conditions in accordance with the present invention.

Reference is now made to FIG. 4, wherein there is shown a flow diagram illustrating a process of changing from a first carrier to a second carrier in response to worsening carrier conditions. Process 400 begins at step 401, wherein a determination is made whether performance of the current carrier is acceptable in comparison to predetermined criteria. If it is determined that the performance of the current carrier is acceptable, execution moves to step 401 again, such that the performance of the current carrier is monitored again. If the performance of the current carrier is not determined at step 401 to be acceptable, execution proceeds to step 402. At step 402, a unit 403 changes from the current carrier to another carrier with reference to a previously-created candidate carrier list, and a carrier change flag is set to 1. The unit 403, shown as a mobile telephone, is preferably a mobile radio terminal that can be, for example, in addition to a mobile telephone, a laptop computer, a pager, an electronic organizer, a personal digital assistant, a smartphone, or the like. Most often, the carrier changed to is the best carrier on the candidate list. From step 402, execution moves to step 401.

It can thus be seen from FIG. 4 that carrier performance is repeatedly monitored. If carrier performance drops below a predetermined value, a change to another carrier on the candidate list occurs and a carrier change flag is set.

If a carrier's performance becomes bad, carrier re-selection can be initiated. This can be either carried out in a controlled way under influence of the master unit, or in an uncontrolled way without master unit influence. If a carrier's performance becomes bad, the slave units can request a new HS carrier, either over the current HS carrier if the master unit participates on this carrier and the HS carrier can still be used for communications, or over the FH carrier (for example via the beacon control carrier) if the master unit is not participating on the HS carrier or if the HS carrier for some other reason cannot be used for communications. The master unit can then redirect the slave units to a new HS carrier. At the same time, the master unit can update the candidate list and distribute the update to the slave units. For HS slave units that do not have a HS connection to the master unit, the update distribution happens over the FH link via the beacon carrier. The "old" carrier (i.e., the carrier whose performance has become poor) can then be removed from the candidate list.

Figure 5:
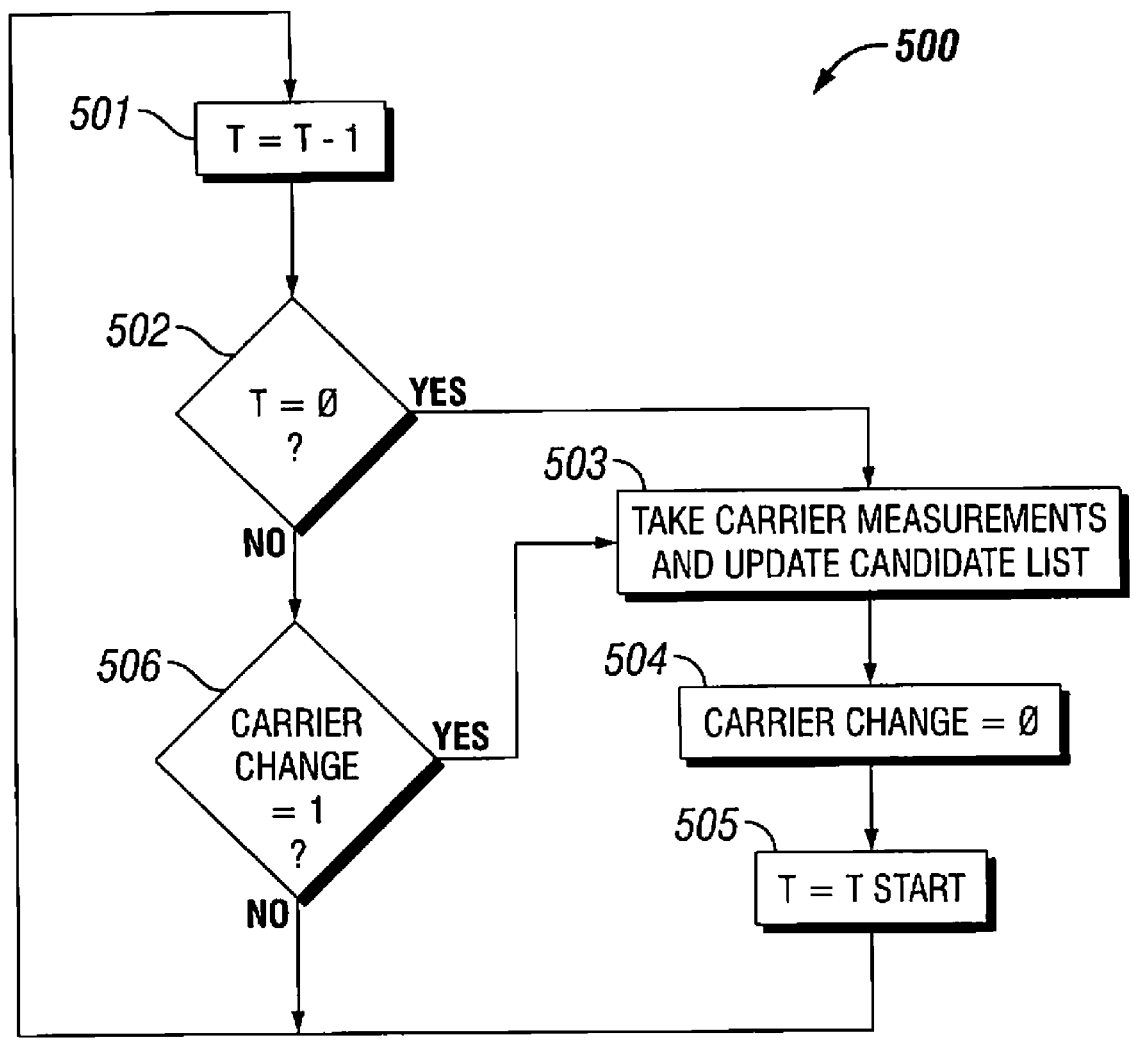
FIG. 5 is a flow diagram illustrating a process of taking carrier measurements and updating a candidate carrier list in accordance with the present invention.

Reference is now made to FIG. 5, wherein there is shown a flow diagram illustrating a process of taking carrier measurements and updating the candidate carrier list in accordance with the present invention. Process 500 begins at step 501 wherein a timer value T is decremented to a value T−1. From step 501, execution proceeds to step 502, wherein a determination is made whether T=0. If it is determined that T=0, execution proceeds to step 503. At step 503, carrier measurements are taken and the candidate list is updated. From step 503, execution proceeds to step 504, wherein the carrier change flag is set to zero. From step 504, execution proceeds to step 505. At step 505, T is set to a predetermined value T.sub.start. From step 505, execution moves to step 501.

If, at step 502, it is determined that T does not equal zero, execution proceeds to step 506. At step 506, a determination is made whether the carrier change flag is equal to one. If so, execution moves to step 503. If not, execution moves to step 501.

It can thus be seen from FIG. 5 that the candidate list is updated in response to either expiration of a timer or to a carrier change having occurred. Therefore, as carrier conditions change, the candidate list is updated.

If the carrier changes vary quickly and there is insufficient time to negotiate with the master unit, such as, for example, when the slave units cannot communicate with the master unit over the HS carrier and must wait for the beacon to arrive (which may take up to several seconds), the units participating on the HS link (both master unit and slave units) can jump in an uncontrolled fashion to another candidate carrier. Of course, this candidate carrier must not be marked as occupied by another HS link. The units need not communicate the identity of the link to which they are jumping to one another so long as they all use the next available carrier on the list. Of course, after the jump, this change should be communicated to the master unit so that the master unit can mark the new frequency as being occupied and communicate the occupied status of the new frequency to all other HS slave units (so they will not jump to the same carrier in an uncontrolled fashion). This communication can be done at a lower rate than that of the HS link.

Even though several units can select the same carrier without negotiation in accordance with the teachings of the present invention, a problem in the time domain remains because the units do not know from one another when the other units jump. This problem can be addressed by use of reserved recovery slots, which are also known as priority slots, in combination with the HS link, as has been described in the U.S. Provisional Patent Application No. 60/180,095 entitled "Selective-repeat Automatic Retransmission Query (ARQ) protocol and/or ping-pong protocol," filed Feb. 3, 2000, in the U.S. Provisional Patent Application No. 60/226,965 entitled "Method and apparatus for medium access on a radio channel," filed Aug. 22, 2000, and in the U.S. patent application Ser. No. 09/710,204 entitled "Method and apparatus for medium access on a radio channel," filed Nov. 9, 2000, all of which are incorporated by reference.

The priority slots indicate when a unit gets unconditional access to the carrier. If the carrier performance becomes bad, the units jump to the next candidate carrier but need only to listen to the new carrier at the next priority slot, which reduces timing uncertainty. For example, if the units lose contact with one another because of poor performance of a carrier (e.g., a carrier 1), they would each jump to the next candidate carrier (e.g., a carrier 2) on the candidate list. Then, each of the units transmits on the carrier 2 when its priority slot occurs and listens at priority slots of all other units. This scheme provides a way for timing uncertainty problems to be minimized.

In another embodiment, the units jump to a new frequency just after a beacon instant. Priority slots are usually defined just after the beacon instant in order to permit smooth continuous communications on the HS carrier. Following an uncontrolled jump, the master unit is informed of the new carrier at the first occasion at which one or more of the slave units involved in the jump can communicate to the master unit. That is, if the master unit was not involved in the jump, the slave units report the new carrier to the master unit.

It should be understood that the terms "comprises" and "comprising," when used in this specification, are taken to specify the presence of stated features, integers, steps, or components, but do not preclude the presence or addition of one or more other features, integers, steps, components or groups thereof.

Although preferred embodiments of the method and system of the present invention have been illustrated in the accompanying FIGURES and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed:

1. A method of dynamically determining the optimum part of an available bandwidth for use by a plurality of units in a frequency-hopping communications system, without taking new carrier measurements each instance when a carrier's performance becomes poor, the method comprising the steps of:

measuring a quality of each of the plurality of carriers;
    ranking the plurality of carriers according to the measured quality, wherein a list of candidate carriers is created in accordance with the ranking of the plurality of carriers;

maintaining the list of candidate carriers to enable a dynamic carrier selection (DCS) algorithm that takes into account multi-path fading conditions in the propagation;

updating the list of candidate carriers periodically in order to adequately reflect which part of the available bandwidth should be used; and initiating carrier reselection from a poor carrier to a better carrier from the list of candidate carriers when the quality of the carrier's performance becomes poor or a timer expires.

2. The method of claim 1, wherein the step of measuring occurs in a frequency-hopping mode and the list of candidate carriers is used in a high-speed mode.

3. The method of claim 2, wherein the high-speed mode is an extension mode of a frequency hopping technology system that is entered into for a limited time when a higher data rate is desired.

4. The method of claim 2, wherein the step of determining which carrier to operate on is made in connection with the high-speed mode.

5. The method of claim 4, wherein a first part of the measurement algorithm is performed when the system is operating in the frequency-hopping mode.

6. The method of claim 2, further comprising the step for using reserved recovery slots in combination with the high-speed link.

7. The method of claim 2, wherein the frequency hopping technology system is Bluetooth.

8. The method of claim 2, wherein if a unit is only involved in high speed traffic during a certain period of time, it remains synchronized to the frequency-hopping carrier.

9. The method of claim 8, further comprising the step of maintaining synchronization by a unit by listening to beacons that are part of the frequency hopping system.

10. The method of claim 1, further comprising the step of creating list of candidate carriers based on measurements taken by a master unit having at least one slave unit.

11. The method of claim 1, further comprising the steps of:
creating the list of candidate carriers by a master unit based on measurements taken by two or more slave units; and
communicating by the master unit to the slave units a change to a high-speed mode.

12. The method of claim 11, wherein at least one of the units in a high-speed mode also takes part in a frequency hopping link by means of a time division based communication between the high speed mode and the frequency hopping mode.

13. The method of claim 12, wherein carrier measurements are taken by the slave units while they are in the frequency hopping mode, and the list of candidate carriers used in the high-speed mode is then appropriately updated.

14. The method of claim 13, wherein, once carrier measurements are taken and processed by the master unit, the candidate list is created or updated and transferred to the slave units.

15. The method of claim 13, wherein, in addition to the candidate carriers, the list of candidate carriers also reveals which of these frequencies are in use by units operating in the high-speed mode.

16. The method of claim 15, wherein the new high-speed carrier is always established in cooperation with the master unit, is indicated as being in use in the list of candidate carriers and is distributed to the slave units.

17. The method of claim 10, further comprising the step of initiating carrier re-selection in a controlled method by the master unit.

18. The method of claim 10, further comprising the steps of requesting, by the at least one slave unit, a new high-speed carrier, either over the current high-speed carrier if the master unit participates on the carrier and the high-speed carrier can still be used for communications, or over the frequency hopping carrier if the master unit is not able to participate on the high-speed carrier.

19. The method of claim 18, further comprising the steps of:
redirecting, by the master unit, at least one of the slave units to a new high-speed carrier;
updating, by the master unit, the list of candidate carriers; and
distributing, by the master unit, the updated list of candidate carriers to the at least one slave units.

20. The method of claim 19, further comprising the step of updating the at least one slave units over a frequency hopping-link via a beacon carrier for high speed slave units that do not have a high-speed connection to the master unit.

21. The method of claim 10, further comprising the step of initiating carrier re-selection in an uncontrolled way without the influence of a master unit.

22. A master unit having a dynamic carrier-selection (DCS) system adapted to determine the optimum part of an available bandwidth for use in a frequency-hopping communications system, the master unit comprising:
a measuring means adapted to measure a quality of each of the plurality of carriers;
a ranking means adapted to rank the plurality of carriers according to the measured quality, wherein a list of candidate carriers is created in accordance with the ranking of the plurality of carriers;
a maintenance means adapted to maintain the list of candidate carriers to enable a DCS algorithm that takes into account multi-path fading conditions in the propagation;
an updating means adapted to update the list of candidate carriers periodically in order to adequately reflect which part of the available bandwidth should be used; and
an initiating means adapted to cause carrier re-selection from a poor carrier to a better carrier from the list of candidate carriers when the quality of the carrier's performance becomes poor or a timer expires.

23. The master unit of claim 22, wherein the measuring means is adapted to measure the quality of each of the plurality of carriers in a frequency-hopping mode and use the list of candidate carriers in a high-speed mode.

24. The master unit of claim 23, wherein the high-speed mode is an extension mode of a frequency hopping technology system that is entered into for a limited time when a higher data rate is desired.

25. The master unit of claim 23, wherein the measuring means adapted to determine which carrier to operate on uses a high-speed mode.

26. The master unit of claim 25, wherein the measuring means of the unit is adapted to perform a first part of the measurement algorithm when the communications system is operating in the frequency-hopping mode.

27. The master unit of claim 23, wherein the measuring means uses reserved recovery slots in combination with the high-speed mode.

28. The master unit of claim 23, wherein the frequency hopping technology system is Bluetooth.

29. The master unit of claim 23, wherein if it is only involved in high speed traffic during a certain period of time, it remains synchronized to the frequency-hopping carrier.

30. The master unit of claim 29, further comprising a synchronization means adapted to maintain synchronization by listening to beacons that are part of the frequency hopping system.

31. The master unit of claim 22, in combination with at least one slave unit.

32. The master unit of claim 22, further comprising two or more slave units, wherein the master unit is adapted to create the list of candidate carriers based on measurements taken by the two or more slave units; and the master unit is adapted to communicate to the slave units a change to a high-speed mode.

33. The master unit of claim 32, wherein at least one of the master unit or slave units in a high-speed mode also takes part in a frequency hopping link by means of a time division communication between the high speed mode and the frequency hopping mode.

34. The master unit of claim 33, wherein carrier measurements are taken by the master unit or slave units while they are in the frequency hopping mode, and the list of candidate carriers used in the high-speed mode is then appropriately updated.

35. The master unit of claim 34, wherein, once carrier measurements are taken and processed by the master unit, the candidate list is created or updated and transferred to the slave units.

36. The master unit of claim 35, wherein, in addition to the candidate carriers, the list of candidate carriers also reveals which of these frequencies are in use by the master unit or slave units operating in the high-speed mode.

37. The master unit of claim 36, wherein the new high-speed carrier established in cooperation with the master unit, is indicated as being in use in the list of candidate carriers and is distributed to the slave units.

38. The master unit of claim 31, adapted to initiate carrier re-selection in a controlled method.

39. The master unit of claim 31, wherein the at least one slave unit is adapted to request a new high-speed carrier, either over the current high-speed carrier if the master unit participates on the carrier and the high-speed carrier can still be used for communications, or over the frequency hopping carrier if the master unit is not able to participate on the high-speed carrier.

40. The master unit of claim 39, adapted to redirect at least one of the slave units to a new high-speed carrier, update the list of candidate carriers, and distribute the updated list of candidate carriers to the at least one slave units.

41. The master unit of claim 40, adapted to update the at least one slave unit over a frequency hopping-link via a beacon carrier for high speed slave units that do not have a high-speed connection to the master unit.

42. The master unit of claim 31, wherein the at least one slave unit is adapted to initiate carrier re-selection in an uncontrolled way without the influence of a master unit.

43. A slave unit in a dynamic carrier-selection system (DCS) for determining the optimum part of an available bandwidth for use in a frequency-hopping communications system, without taking new carrier measurements each instance when a carrier's performance becomes poor, the slave unit comprising:
   a measuring means adapted to measure a quality of each of the plurality of carriers; and
   a transmission means adapted to transmit the measure of quality to a master unit, said master unit having a ranking means adapted to rank the plurality of carriers according to the measured quality, wherein a list of candidate carriers is created in accordance with the ranking of the plurality of carriers.

44. The slave unit of claim 43, wherein the master unit is adapted to maintain the list of candidate carriers to enable a DCS algorithm that takes into account multi-path fading conditions in the propagation, update the list of candidate carriers periodically in order to adequately reflect which part of the available bandwidth should be used, and cause carrier re-selection from a poor carrier to a better carrier from the list of candidate carriers.

45. The slave unit of claim 43, wherein the measuring means is adapted to measure the quality of each of the plurality of carriers in a frequency-hopping mode and use the list of candidate carriers in a high-speed mode.

46. The slave unit of claim 45, wherein the high-speed mode is an extension mode of a frequency hopping technology system that is entered into for a limited time when a higher data rate is desired.

47. The slave unit of claim 45, wherein the measuring means adapted to determine which carrier to operate on uses a high-speed mode.

48. The slave unit of claim 47, wherein the measuring means of the unit is adapted to perform a first part of the measurement algorithm when the system is operating in the frequency-hopping mode.

49. The slave unit of claim 45, wherein the measuring means uses reserved recovery slots in combination with the high-speed mode.

50. The slave unit of claim 45, wherein the frequency hopping technology system is Bluetooth.

51. The slave unit of claim 45, wherein if the slave unit is only involved in high speed traffic during a certain period of time, it remains synchronized to the frequency-hopping carrier.

52. The slave unit of claim 51, further comprising a synchronization means adapted to maintain synchronization by the slave unit in the system by listening to beacons that are part of the frequency hopping system.

53. The slave unit of claim 43, in combination with a master unit adapted to create the list of candidate carriers.

54. The slave unit of claim 53, wherein the master unit is adapted to create the list of candidate carriers based on measurements taken by the two or more slave units; and the master unit is adapted to communicate to the slave units a change to a high-speed mode.

55. The slave unit of claim 54, wherein the slave unit in a high-speed mode also takes part in a frequency hopping link by means of a time division communication between the high speed mode and the frequency hopping mode.

56. The slave unit of claim 55, wherein carrier measurements are taken by the slave unit while it is in the frequency hopping mode, and the list of candidate carriers used in the high-speed mode is then appropriately updated.

57. The slave unit of claim 56, wherein, once carrier measurements are taken and processed by the master unit, the candidate list is created or updated and transferred to the slave units.

58. The slave unit of claim 57, wherein, in addition to the candidate carriers, the list of candidate carriers also reveals which of these frequencies are in use by units operating in the high-speed mode.

59. The slave unit of claim 58, wherein the new high-speed carrier is established in cooperation with the master unit, is indicated as being in use in the list of candidate carriers and is distributed to the slave units.

60. The slave unit of claim 53, wherein the master unit is adapted to initiate carrier re-selection in a controlled method.

61. The slave unit of claim 53, wherein the slave unit is adapted to request a new high-speed carrier, either over the current high-speed carrier if the master unit participates on the carrier and the high-speed carrier can still be used for communications, or over the frequency hopping carrier if the master unit is not able to participate on the high-speed carrier.

62. The slave unit of claim 61, wherein the master unit is adapted to redirect at least one of the slave units to a new high-speed carrier, update the list of candidate carriers; and distribute the updated list of candidate carriers to the at least one slave units.

63. The slave unit of claim 62, wherein the master unit is adapted to update the at least one slave units over a frequency hopping-link via a beacon carrier for high speed slave units that do not have a high-speed connection to the master unit.

64. The slave unit of claim 53, adapted to initiate carrier re-selection in an uncontrolled way without the influence of a master unit.

65. A dynamic carrier-selection (DCS) system of a master unit and at least one slave unit, adapted to determine the optimum part of an available bandwidth for use in a frequency-hoppinq communications system, without taking new carrier measurements each instance when a carrier's performance becomes poor, the DCS system comprising:

- a measuring means in a unit of the system adapted to measure a quality of each of the plurality of carriers;
- a ranking means in a unit of the system adapted to rank the plurality of carriers according to the measured quality, wherein a list of candidate carriers is created in accordance with the ranking of the plurality of carriers;
- a maintenance means in a unit of the system adapted to maintain the list of candidate carriers to enable a DCS algorithm that takes into account multi-path fading conditions in the propagation;
- an updating means in a unit in the system adapted to update the list of candidate carriers periodically in order to adequately reflect which part of the available bandwidth should be used; and
- an initiating means in a unit in the system adapted to cause carrier re-selection from a poor carrier to a better carrier from the list of candidate carriers when the quality of the carrier's performance becomes poor or a timer expires.

66. The DCS system of claim 65, wherein the measuring means is adapted to measure the quality of each of the plurality of carriers in a frequency-hopping mode and use the list of candidate carriers in a high-speed mode.

67. The DCS system of claim 66, wherein the high-speed mode is an extension mode of a frequency hopping technology system that is entered into for a limited time when a higher data rate is desired.

68. The DCS system of claim 66, wherein the measuring means adapted to determine which carrier to operate on uses a high-speed mode.

69. The DCS system of claim 68, wherein the measuring means of the unit is adapted to perform a first part of the measurement algorithm when the system is operating in the frequency-hopping mode.

70. The DCS system of claim 66, wherein the measuring means uses reserved recovery slots in combination with the high-speed mode.

71. The DCS system of claim 66, wherein the frequency hopping technology system is Bluetooth.

72. The DCS system of claim 66, wherein if a unit is only involved in high speed traffic during a certain period of time, it remains synchronized to the frequency-hopping carrier.

73. The DCS system of claim 72, further comprising a synchronization means adapted to maintain synchronization by a unit in the system by listening to beacons that are part of the frequency hopping system.

74. The DCS system of claim 65, wherein the system further comprises a master unit adapted to create the list of candidate carriers and at least one slave unit.

* * * * *

UNITED STATES PATENT AND TRADEMARK OFFICE
CERTIFICATE OF CORRECTION

| | | |
|---|---|---|
| PATENT NO. | : 7,949,302 B2 | Page 1 of 1 |
| APPLICATION NO. | : 12/357983 | |
| DATED | : May 24, 2011 | |
| INVENTOR(S) | : Wilhelmsson et al. | |

It is certified that error appears in the above-identified patent and that said Letters Patent is hereby corrected as shown below:

Title Page, Item (75), under "Inventors", delete "Barsebäck" and insert -- Lund --, therefor.

In Column 2, Line 34, delete "carriers" and insert -- carrier's --, therefor.

In Column 4, Line 20, delete "carriers" and insert -- carrier's --, therefor.

In Column 4, Line 24, delete "carriers" and insert -- carrier's --, therefor.

In Column 13, Lines 24-25, in Claim 65, delete "frequency-hoppinq" and insert -- frequency-hopping --, therefor.

Signed and Sealed this
Eighth Day of November, 2011

David J. Kappos
*Director of the United States Patent and Trademark Office*